(12) United States Patent
Koike et al.

(10) Patent No.: US 10,946,369 B2
(45) Date of Patent: Mar. 16, 2021

(54) HONEYCOMB STRUCTURE BODY (71) Applicant: DENSO CORPORATION, Kariya (JP)

(72) Inventors: Kazuhiko Koike, Nisshin (JP);
Keisuke Mizutani, Nisshin (JP);
Hiroaki Kayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/831,947

(22) Filed: Mar. 27, 2020

(65) Prior Publication Data
US 2020/0306743 A1 Oct. 1, 2020

(30) Foreign Application Priority Data

Mar. 29, 2019 (JP) .............................. JP2019-068514

(51) Int. Cl.
B01J 35/04 (2006.01)
B01D 46/24 (2006.01)
B01D 53/94 (2006.01)
B01J 23/42 (2006.01)
B01J 23/44 (2006.01)
B01J 23/46 (2006.01)

(52) U.S. Cl.
CPC ............ *B01J 35/04* (2013.01); *B01D 46/247* (2013.01); *B01D 46/2425* (2013.01); *B01D 53/9454* (2013.01); *B01J 23/42* (2013.01); *B01J 23/44* (2013.01); *B01J 23/464* (2013.01); *B01D 2046/2481* (2013.01); *B01D 2046/2496* (2013.01); *B01D 2255/1021* (2013.01); *B01D 2255/1023* (2013.01); *B01D 2255/1025* (2013.01); *B01D 2255/9155* (2013.01); *B01D 2279/30* (2013.01)

(58) Field of Classification Search
CPC ....... B01J 35/04; B01J 23/42; B01D 46/2425; B01D 46/247; B01D 53/9454; B01D 2046/2481
USPC .............................. 55/523; 422/180; 428/116
See application file for complete search history.

(56) References Cited

U.S. PATENT DOCUMENTS

| 4,451,517 A | * | 5/1984 | Inoguchi ................ B01D 53/86 422/180 |
| 5,346,722 A | * | 9/1994 | Beauseigneur ...... B01J 37/0215 423/273 |
| 5,514,446 A | | 5/1996 | Machida et al. |

(Continued)

FOREIGN PATENT DOCUMENTS

| JP | 57-99340 | 6/1982 |
| JP | 2004-196597 | 7/2004 |
| JP | 2018-199616 | 12/2018 |

*Primary Examiner* — Tom P Duong
(74) *Attorney, Agent, or Firm* — Nixon & Vanderhye P.C.

(57) ABSTRACT

A honeycomb structure body has a skin part of a cylindrical shape and a honeycomb structural part formed with the skin part together in a monolithic body. The skin part and the honeycomb structural part have partition walls of a porous structure. The cells have first cells arranged adjacent to the skin part and second cells arranged adjacent to the first cells. The skin part, the first cells and the second cells form an outer peripheral section. A central section is arranged inside the outer peripheral section. The honeycomb structure body satisfies a relationship in which a thermal expansion coefficient of the outer peripheral section is greater than a thermal expansion coefficient of the central section.

9 Claims, 8 Drawing Sheets

(56) References Cited

U.S. PATENT DOCUMENTS

| | | | |
|---|---|---|---|
| 6,596,372 B2 * | 7/2003 | Ito | B01J 35/04 264/631 |
| 2001/0033910 A1 | 10/2001 | Ikeshima | |
| 2003/0041574 A1 | 3/2003 | Noguchi et al. | |
| 2007/0269634 A1 * | 11/2007 | Suenobu | B01D 46/0001 428/116 |
| 2008/0274324 A1 * | 11/2008 | Mizutani | F01N 3/0222 428/73 |
| 2009/0155527 A1 | 6/2009 | Kawai et al. | |
| 2009/0155528 A1 | 6/2009 | Kawai et al. | |
| 2009/0205303 A1 | 8/2009 | Ichikawa et al. | |
| 2009/0252919 A1 * | 10/2009 | Ogura | B01D 46/2451 428/116 |
| 2014/0116016 A1 | 5/2014 | Mizuno et al. | |
| 2015/0252702 A1 | 9/2015 | Ito | |
| 2015/0258483 A1 | 9/2015 | Kikuchi | |
| 2018/0326343 A1 * | 11/2018 | Beall | B01D 46/2418 |

\* cited by examiner

HONEYCOMB STRUCTURE BODY

CROSS-REFERENCE TO RELATED APPLICATION

This application is related to and claims priority from Japanese Patent Application No. 2019-68514 filed on Mar. 29, 2019, the contents of which are hereby incorporated by reference.

TECHNICAL FIELD

The present disclosure relates to honeycomb structure bodies, made of ceramic, having a skin part and a honeycomb structural part.

BACKGROUND

For example, exhaust gas, emitted from internal combustion engines such as diesel engines and petrol engines and heat engines such as boilers, contains hazardous gases, and particulate matter (PM) as solid and liquid particles which become suspended in air many of which are hazardous. Hazardous gases include nitrogen oxide (NOx), carbon monoxide (CO), hydrocarbon (HC), etc. A ceramic structure body collects PM contained exhaust gas so as to purify such hazardous gases in the exhaust gas.

Exhaust gas emitted from an internal combustion engine at a high temperature flows through a honeycomb structure body made of ceramic. In general, exhaust gas at a high temperature easily flows through a core part, i.e. a central area more than an outer peripheral part of the honeycomb structure body. This easily causes a temperature difference between the core part and the outer peripheral part. Thermal shock is applied to the honeycomb structure body due to a generated temperature difference, and introduces a risk of breakage of the honeycomb structure body.

For example, there is a honeycomb structure body which has a reinforced outer peripheral wall. Specifically, this honeycomb structure body has the reinforced outer peripheral wall composed of a first outer peripheral wall and a second outer peripheral wall. The second outer peripheral wall is formed on the first outer peripheral wall in order to prevent the honeycomb structure body from being fractured.

However, the honeycomb structure body previously described does not have a monolithic outer peripheral wall, and has a boundary section formed between the first outer peripheral wall and the second outer peripheral wall. Because cracks may be often generated in the boundary section due to thermal shock, it is necessary to improve the strength of the honeycomb structure body so as to reduce influence of thermal shock.

There is a recent tendency in which a temperature of exhaust gas emitted from internal combustion engines increases due to improvement thereof. Further, it is necessary to arrange the honeycomb structure body at a location close to an internal combustion engine so as to improve the performance of exhaust gas purification. The tendency previously described further increases a temperature of exhaust gas flowing in the honeycomb structure body, and increases the magnitude of thermal shock due to temperature increase of exhaust gas. It is accordingly necessary to improve a structure of the honeycomb structure body so as to reduce the magnitude of thermal shock applied to a honeycomb structure body.

SUMMARY

It is desired for the present disclosure to provide a honeycomb structure body having a skin part of a cylindrical shape, and a honeycomb structural part formed with the skin part together in a monolithic body. The skin part and the honeycomb structural part have partition walls of a porous structure in which pores are formed. The partition walls form cells. Each of the cells is surrounded by the partition walls, and extends in an axial direction of the honeycomb structure body. The cells have first cells and second cells. The first cells are arranged adjacent to the skin part. The second cells are arranged adjacent to the first cells. The skin part, the first cells and the second cells form an outer peripheral section. A central section is arranged inside the outer peripheral section in the honeycomb structural body. In particular, the honeycomb structure body satisfies a relationship in which a thermal expansion coefficient of the outer peripheral section is greater than a thermal expansion coefficient of the central section.

BRIEF DESCRIPTION OF THE DRAWINGS

A preferred, non-limiting embodiment of the present disclosure will be described by way of example with reference to the accompanying drawings, in which.

DETAILED DESCRIPTION OF THE PREFERRED EMBODIMENTS

Hereinafter, various embodiments of the present disclosure will be described with reference to the accompanying drawings. In the following description of the various embodiments, like reference characters or numerals designate like or equivalent component parts throughout the several diagrams.

First Exemplary Embodiment

A description will be given of a honeycomb structure body 1 made of ceramic according to a first exemplary embodiment with reference to FIG. 1 to FIG. 7.

Figure 1:
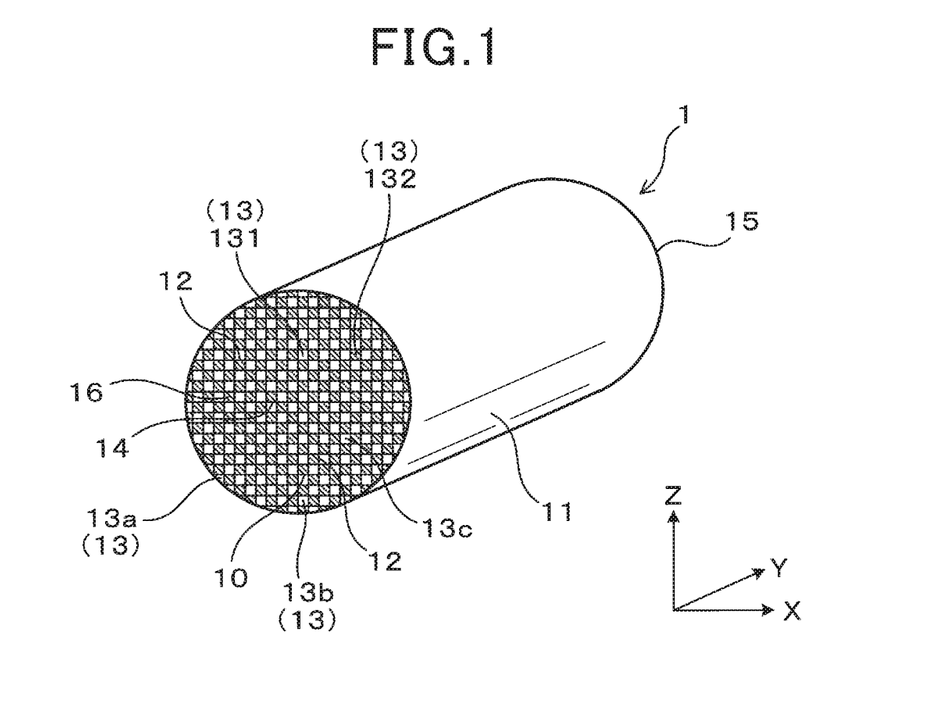
FIG. 1 is a perspective view showing an outline of a honeycomb structure body made of ceramic according to a first exemplary embodiment of the present disclosure.
Figure 2:
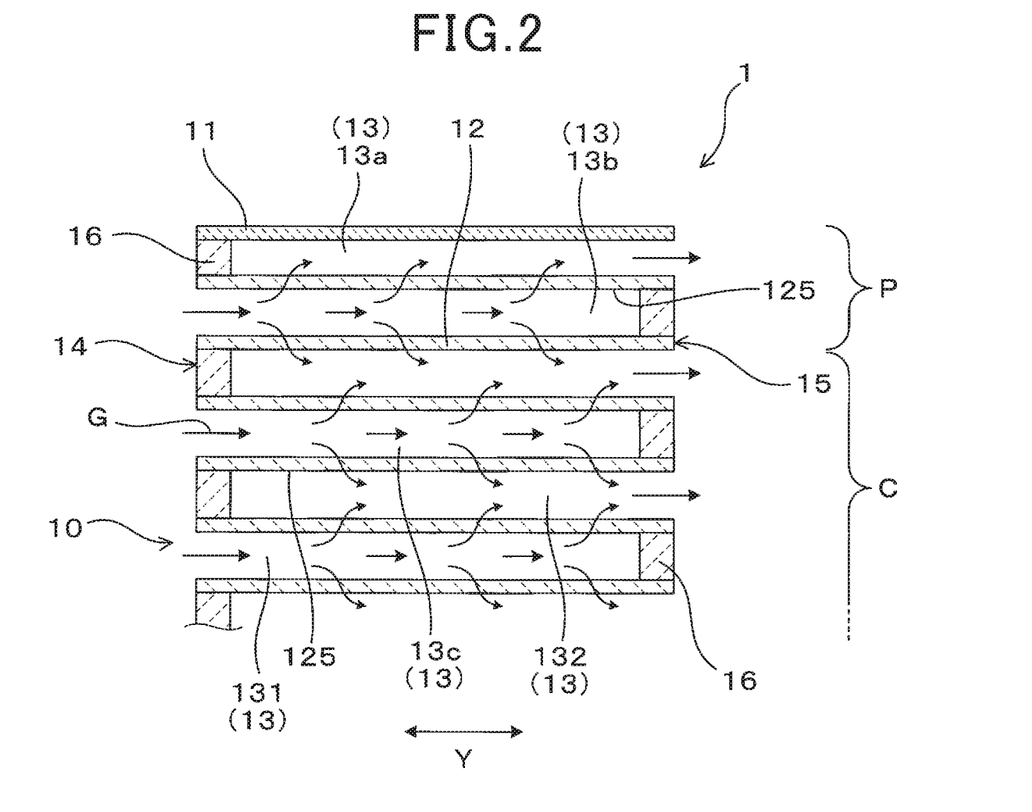
FIG. 2 is a view showing an enlarged partial cross section of the honeycomb structure body according to the first exemplary embodiment along an axial direction of the honeycomb structure body shown in FIG. 1.
Figure 3:
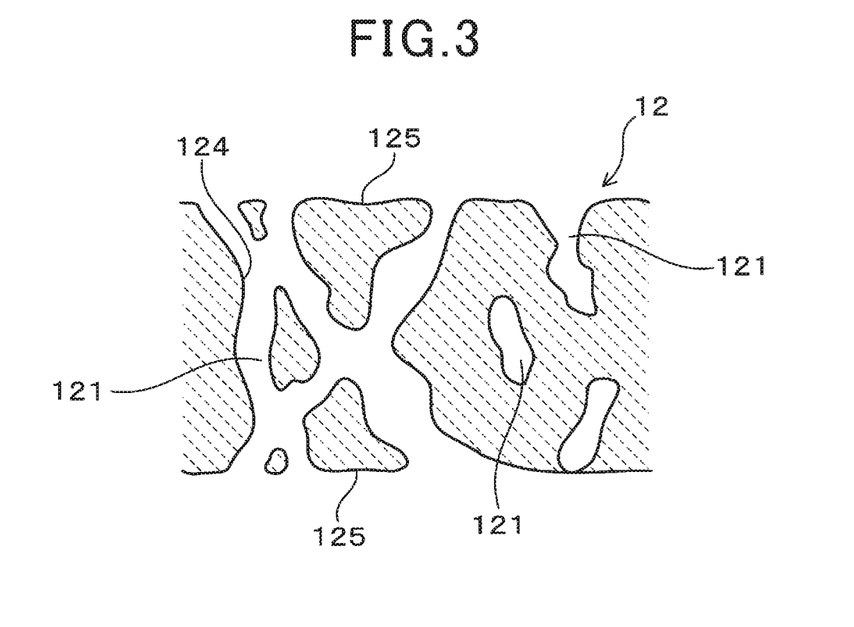
FIG. 3 is a schematic view showing an enlarged partial cross section of a partition wall formed in the honeycomb structure body according to the first exemplary embodiment shown in FIG. 1.

FIG. 1 is a perspective view showing an outline of the honeycomb structure body 1 made of ceramic according to the first exemplary embodiment. FIG. 2 is a view showing an enlarged partial cross section of the honeycomb structure body 1 according to the first exemplary embodiment along an axial direction of the honeycomb structure body shown in FIG. 1. FIG. 3 is a schematic view showing an enlarged partial cross section of a partition wall 12 formed in the honeycomb structure body 1 according to the first exemplary embodiment shown in FIG. 1.

As shown in FIG. 1 to FIG. 3, the honeycomb structure body 1 according to the first exemplary embodiment has a skin part 11 and a honeycomb structural part 10. As shown in FIG. 1 and FIG. 2, the honeycomb structure body 1 according to the first exemplary embodiment has sealing members 16. The sealing members 16 are formed on a first end surface 14 of the honeycomb structure body 1 and a second end surface 15 thereof. The formation of the sealing members 16 will be explained later.

The honeycomb structure body 1 made of ceramic will also be referred to as an exhaust gas purification filter which captures particulate matter (PM) contained in exhaust gas G (see FIG. 2) so as to purify exhaust gas. For example, exhaust gas contains hazardous gases and PM as the sum of all solid and liquid particles suspended in air many of which are hazardous.

The skin part 11 shown in FIG. 1 and FIG. 2 has a cylindrical shape, for example. An axial direction Y of the skin part 11 will also be referred to as the axial direction Y of the honeycomb structure body 1.

It is preferable for the skin part 11 of the honeycomb structure body 1 to have a thickness of not more than 1000 μm. This structure makes it possible to reduce a heat capacity of the honeycomb structure body 1, and allows the honeycomb structure body 1 to be easily heated at a quick rate to a required temperature. For example, this structure makes it possible to easily and quickly heat the honeycomb structure body 1 at a required temperature, which supports catalyst, a structure of which will be explained in detail in a second exemplary embodiment. In other words, the reduction of the skin part 11 makes it possible to increase the exhaust gas purification capability of the honeycomb structure body 1. From the viewpoint, it is more preferable for the skin part 11 of the honeycomb structure body 1 to have a thickness of not more than 500 μm. It is most preferable for the skin part 11 to have a thickness of not more than 300 μm. Further, in another view of adequately increasing the strength of the overall honeycomb structure body 1, it is preferable for the skin part 11 of the honeycomb structure body 1 to have a thickness of not less than 200 μm.

The honeycomb structure body 1 has the honeycomb structural part 10 and the skin part 11. In the honeycomb structure body 1, the honeycomb structural part 10 and the skin part 11 are formed as a monolithic body. The honeycomb structural part 10 is arranged in the inside chamber of the skin part 11. The honeycomb structural part 10 has a partition structure in which a plurality of cells 13 are formed along the axial direction Y of the honeycomb structure body 1. That is, on a cross section of the honeycomb structural part 10, which is perpendicular to the axial direction Y of the honeycomb structure body 1, the cells are formed and arranged in a lattice arrangement. For example, it is possible to produce the honeycomb structure body 1 having a monolithic body composed of the honeycomb structural part 10 and the skin part 11 by performing an extrusion and mold step.

The monolithic body composed of the honeycomb structural part 10 and the skin part 11 is made of ceramic, i.e. cordierite, ceria, zirconia, ceria-zirconia solid solution, silicon carbide, aluminum titanate, alumina, mullite, etc. From the viewpoint of preventing the honeycomb structure body 1 from being oxidized in oxidizing atmosphere such as exhaust gas, it is preferable for the honeycomb structural part 10 and the skin part 11 to be made of oxide ceramic such as cordierite, ceria, zirconia, ceria-zirconia solid solution, silicon carbide, aluminum titanate, alumina, mullite, etc.

Further, from the viewpoint of superior thermal shock resistance, it is more preferable for the honeycomb structural part 10 and the skin part 11 to be made of cordierite.

The honeycomb structural part 10 has the partition walls 12 and the cells 13. That is, the arrangement of the partition walls 12 forms the cells 3 in the inside of the skin part 11. The partition walls 12 will also be referred to as cell walls.

The partition walls 12 are arranged in a lattice arrangement. The honeycomb structure body 1 made of ceramic has a porous structure comprising pores 121. As shown in FIG. 3, the pores 121 are formed in the partition walls 12. As shown in FIG. 2, the honeycomb structure body 1 has sealing members which are formed on each of the first end surface 14 and the second end surface 15 of the honeycomb structural part 10. The sealing members are alternately formed on the first end surface 14 to form a lattice arrangement. Similarly, the sealing members are alternately formed on the second end surface 15 to form a lattice arrangement. In more detail, as shown in FIG. 2, one end of each cell 12 is plugged by the sealing member 16 and the other end of each cell 12 is not plugged and open. Exhaust gas G is introduced into the inside of the honeycomb structural part 10 through openings of the cells 12 on the first end surface 14, and is passing through the partition walls 12 to the inside of the adjacent cell 12, and is discharged to the outside of the honeycomb structure body 1 through the openings of the cells 12 on the second end surface 15. PM contained in exhaust gas G is captured on and collect by the surfaces of the partition walls 12 and the inside of the pores 121. The arrow shown in FIG. 2 indicates the flow of exhaust gas G when the honeycomb structure body 1 is arranged on the exhaust gas pipe 3 (not shown) joined to an internal combustion engine.

As shown in FIG. 1 and FIG. 2, the honeycomb structure body 1 made of ceramic has a plurality of the cells 13. Each of the cells 13 is surrounded by the partition walls 12 and forms a flow passage of exhaust gas G. Each of the cells 13 is formed along the axial direction Y of the honeycomb structure body 1. For example, it is possible for the honeycomb structure body 1 to have a cell density within a range of 150 to 600 cpsi (cells/inch$^2$).

As shown in FIG. 1, on a cross section of the honeycomb structure body 1, which is perpendicular to the axial direction Y, each of the cells 13 has a square shape. However, the present disclosure does not limit the shape of the cells 13. For example, it is acceptable for each cell to have a circular shape and a polygonal shape such as a triangle shape, a rectangular shape, a hexagonal shape, etc. It is also acceptable for the honeycomb structure body 1 to have cells composed of a combination of two or more types of shapes.

The honeycomb structure body 1 has a cylindrical shape, for example. It is possible for the honeycomb structure body 1 to have an overall size thereof according to applications. As previously described, the honeycomb structure body 1 has the first end surface 14 and the second end surface 15. For example, exhaust gas G flowing in the exhaust gas pipe (not shown) is introduced to the inside of the honeycomb structure body 1 through the first end surface 14, and the exhaust gas G is discharged from the second end surface 15 to the outside of the honeycomb structure body 1 in the exhaust gas pipe (not shown). It is also acceptable for exhaust gas G to enter the inside of the honeycomb structure body 1 through the second end surface 15.

That is, the cells 13 are grouped to an inlet cell group and an outlet cell group. The inlet cell group is composed of inlet cells 131. The outlet cell group is composed of outlet cells 132. Exhaust gas G is introduced in the inside of the honeycomb structure body 1 through the inlet cells 131. The exhaust gas is discharged to the outside of the honeycomb structure body 1 through the outlet cells 132.

As shown in FIG. 2, each of the inlet cells 131 is open on the first end surface 14 of the honeycomb structure body 1. Further, each of the inlet cells 131 is closed, i.e. plugged by the sealing member 16 on the second end surface 15 of the honeycomb structure body 1. On the other hand, each of the outlet cells 132 is closed, i.e. plugged by the sealing member 16 on the first end surface 14 of the honeycomb structure body 1. Further, each of the outlet cells 132 is open on the first end surface 14 of the honeycomb structure body 1.

When no exhaust gas is introduced in the inside of the honeycomb structure body 1, the inlet cells 131 and the outlet cells 132 are symmetric are arranged in a symmetric arrangement. The inlet cells 131 and the outlet cells 132 are used to introduce exhaust gas and discharge it.

The sealing members 16 are alternately formed and arranged on each of the first end surface 14 and the second end surface 15. For example, it is possible to use the sealing members 16 made of ceramic such as cordierite. It is also acceptable to use another material to form the sealing members 16. On the cross section shown in FIG. 2, each of the sealing members 16 has a plug shape. It is also acceptable for each sealing member 16 to have another shape so long as the end part of each cell is completely sealed.

It is also possible to deform a part of the partition walls 12 on each of the first end surface 14 and the second end surface 15 so as to provide the sealing members 16. This structure allows the partition walls 12 and the sealing members 16 from being formed in a monolithic body.

The inlet cells 131 and the outlet cells 132 are alternately arranged on each of the first end surface 14 and the second end surface 15 in the axial direction Y, a lateral direction X which is perpendicular to the axial direction Y, and a vertical direction Z which is perpendicular to each of the axial direction Y and the lateral direction X. That is, when each of the first end surface 14 and the second end surface 15 is viewed from the axial direction Y of the honeycomb structure body 1, the inlet cells 131 and the outlet cells 132 are alternately arranged in a checked pattern.

As shown in FIG. 2, the inlet cells 131 and the outlet cells 132 are alternately arranged along the axial direction Y of the honeycomb structure body 1. The partition walls 12 separate the inlet cells 131 from the outlet cells 132.

As shown in FIG. 3, a plurality of the pores 121 are formed in each of the partition walls 12. Although FIG. 3 shows a two dimensional image of the pores 121, the pores 121 are formed to have three dimensional structure in the honeycomb structure body 1, and the pores 121 intersect from each other.

Figure 4:
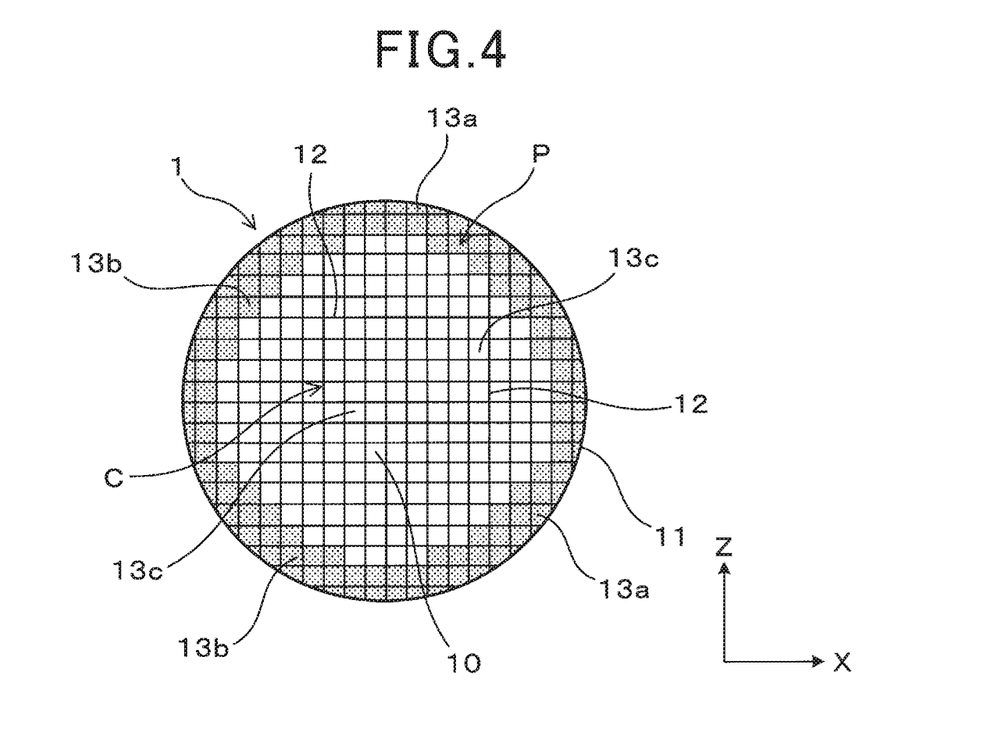
FIG. 4 is a view showing a cross section of the honeycomb structure body in a direction which is orthogonal to the axial direction of the honeycomb structure body.

FIG. 4 is a view showing a cross section of the honeycomb structure body 1 in a direction which is orthogonal to the axial direction thereof. That is, FIG. 4 shows a cross section of the honeycomb structure body 1 in the lateral direction X and the lateral direction X, which are perpendicular to the axial direction Y of the honeycomb structure body 1. As shown in FIG. 4, the honeycomb structure body 1 has an outer peripheral section P and a central section C. The skin part 11, a plurality of a first cells 13a and a plurality of second cells 13b are formed in the outer peripheral section P. That is, the outer peripheral section P is arranged at the outward edge of the honeycomb structure body 1, which is perpendicular to the axial direction Y. When the honeycomb structure body 1 has a cylindrical shape, this direction, which is perpendicular to the axial direction Y, indicates the radius direction of the cylindrical shape.

In the cross section shown in FIG. 4, the outer peripheral section P is shown by black and white halftones. The central section C are shown without halftone, to be surrounded by the outer peripheral section P.

The first cells 13a are arranged adjacent to the skin part 11. That is, the first cells 13a are surrounded by the skin part 11 and the partition walls 12. The second cells 13b are incomplete cells because of having an incomplete shape when compared with a shape of each of the cells 13, i.e. each of the second cells 13b and third cells 13c. As shown in FIG. 4, the second cells 13b and the third cells 13c have a predetermined shape and are arranged at the location inside of the first cells 13a. The second cells 13b and the third cells 13c are complete cells because of having the predetermined same shape. The third cells 13c will be explained later.

Except for the first cells 13a, as shown in FIG. 4, each of the second cells 13b and the third cells 13c has a square shaped cross section in a direction which is perpendicular to the axial direction Y. Each of the first cells 13a has a polygonal shape such as a square or a triangle, in which one side thereof is a curved shape.

The second cells 13b are arranged adjacent to the first cells 13a. The direction, to which each second cell 13b faces, i.e. is adjacent to the corresponding first cell 13a, lies along the radial direction of the honeycomb structure body 1. As shown in FIG. 4, there are several directions. In one direction, the cells 13 and the partition walls 12 are arranged. In other direction, the cells 13 are arranged along diagonal directions of the cells 13 on a cross section, which is perpendicular to the axial direction of the honeycomb structure body 1. For example, on a cross section, which is perpendicular to the axial direction Y shown in FIG. 1 and FIG. 4, the square shaped cells as the cells 13 are arranged in the lateral direction X and the vertical direction Z. The cells 13 are arranged along the lateral direction X, the vertical direction Z and the diagonal direction which divides an angle formed between the lateral direction X and the vertical direction Z. The second cells 13b are the complete cells.

On a cross section which is perpendicular to the axial direction Y of the honeycomb structure body 1 shown in FIG. 4, the cells 13, arranged inside the second cells 13b will be referred to as the third cells 13c. As shown in FIG. 4, a plurality of the third cells 13c are arranged in the central section C. Each of the third cells 13c is a complete cell.

Further, the honeycomb structure body 1 according to the first exemplary embodiment has the improved structure in which the outer peripheral section P has a thermal expansion coefficient $P_{CTE}$ which is greater than a thermal expansion coefficient $C_{CTE}$ of the central section C. That is, the honeycomb structure body 1 satisfies the relationship of $P_{CTE} > C_{CTE}$. Measurement pieces are extracted from several locations on three cross sections in each test sample, and the thermal expansion coefficient $P_{CTE}$ and the thermal expansion coefficient $C_{CTE}$ thereof are detected. These three cross sections are located at an inlet side of exhaust gas G, a middle side and an outlet side of exhaust gas G in each test sample as the honeycomb structure body 1. Three measurement pieces are extracted from each of the cross section at the inlet side, the cross section at the middle and the cross section at the outlet side in each test sample. This measurement step will be explained later.

When exhaust gas G flows into the inside of the honeycomb structure body 1 if the honeycomb structure body 1 satisfies the relationship of $P_{CTE} \leq C_{CTE}$, the central section C has a temperature which becomes higher than that of the outer peripheral section P, and this often causes generation of cracks in the honeycomb structure body 1, and the honeycomb structure body 1 is fractured. Accordingly, it is possible to solve this drawback when the honeycomb structure body 1 satisfies the relationship of $P_{CTE} > C_{CTE}$. This will be explained in detail.

Figure 6:
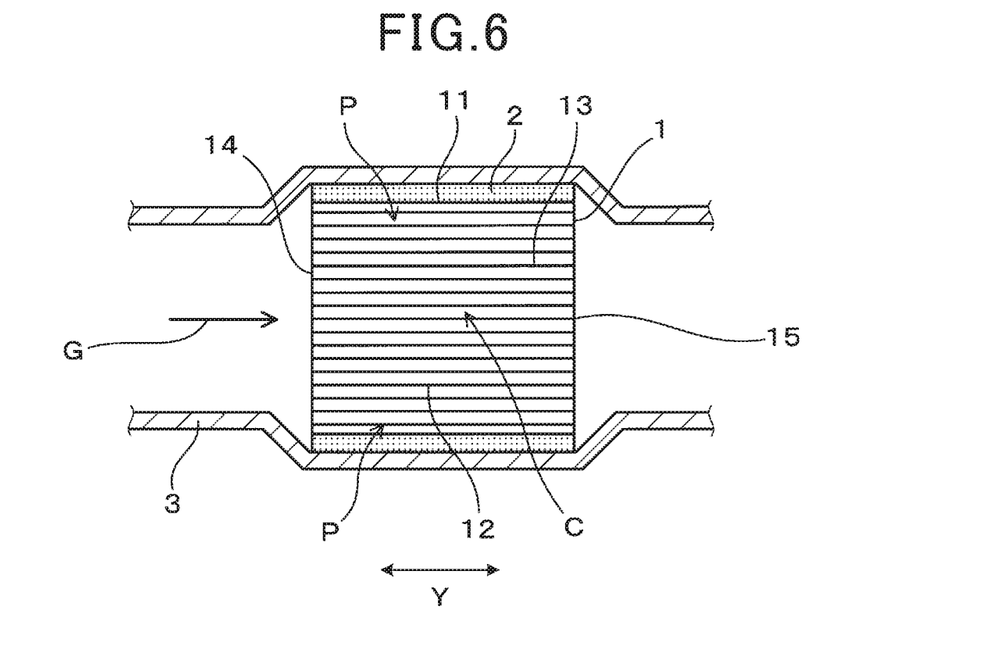
FIG. 6 is a view showing a schematic cross section of the honeycomb structure body according to the first exemplary embodiment arranged in an exhaust gas pipe joined to an internal combustion engine.

FIG. 6 is a view showing a schematic cross section of the honeycomb structure body 1 according to the first exemplary embodiment arranged in an exhaust gas pipe 3 joined to an internal combustion engine (not shown). As shown in FIG. 6, the honeycomb structure body 1 is arranged at the inside of the exhaust gas pipe 3. The plug members 16, etc. are omitted from FIG. 6 for brevity.

As shown in FIG. 6, when exhaust gas G flowing in the exhaust gas pipe 3 enters the inside of the honeycomb structure body 1 and the honeycomb structure body 1 is heated by the exhaust gas G of a high temperature, a temperature of the central section C becomes higher than a temperature of the outer peripheral section P on a cross section which is perpendicular to the axial direction Y of the honeycomb structure body 1. This easily generates a temperature difference between the central section C and the outer peripheral section P. This phenomenon easily and often occurs when the exhaust gas G has a very high temperature.

On the other hand, when the honeycomb structure body 1 has a structure which satisfies the relationship of $P_{CTE} \leq C_{CTE}$, i.e. when the central section C has the thermal expansion coefficient $C_{CTE}$ which is not less than the thermal expansion coefficient $P_{CTE}$ of the outer peripheral section P, the central section C has a temperature which is higher than that of the outer peripheral section P due to the introduction of the exhaust gas G. This causes that the central section C is more extended, and the outer peripheral section P is not almost extended. As a result, this causes thermal shock due to a thermal expansion between the central section C and the outer peripheral section P, and often generates cracks in the honeycomb structure body 1.

When the honeycomb structure body 1 has the structure which satisfies the relationship of $P_{CTE} > C_{CTE}$, i.e. when the central section C has the thermal expansion coefficient $C_{CTE}$ which is less than the thermal expansion coefficient $P_{CTE}$ of the outer peripheral section P, this causes that the outer peripheral section P is more extended and the central section C is not almost extended. When the central section C is extended due to the introduction of the exhaust gas G and a temperature rising of the central section C, the outer peripheral section P is more extended by a small temperature rise because the outer peripheral section P has a large thermal expansion coefficient $P_{CTE}$. Accordingly, this structure reduces the thermal coefficient difference between the central section C and the outer peripheral section P, and reduces a magnitude of thermal shock generated in the honeycomb structure body 1. As a result, this structure makes it possible to suppress the honeycomb structure body 1 from being fractured.

Further, when the honeycomb structure body 1 has the structure which satisfies the relationship of $P_{CTE} > C_{CTE}$, this makes it possible to suppress the heat capacity of the honeycomb structure body 1 from increasing as compared with a heat capacity of a honeycomb structure body having a structure in which a ceramics layer is stacked on the skin part 11 so as to reinforce the skin part 11. This further makes it possible to suppress the honeycomb structure body 1 from being fractured due to thermal shock. As previously described, the honeycomb structure body 1 according to the first exemplary embodiment has an improved structure in which the honeycomb structural part 10 and the skin part 11 having a cylindrical shape are formed together as a monolithic body. In the improved structure of the honeycomb structure body 1 shown in FIG. 6, the honeycomb structure body 1 is wrapped with a retaining mat 2, for example, and arranged in the inside of the exhaust gas pipe 3. The retaining mat 2 is made of ceramic fiber such as alumina fibers.

As previously described, the structure of the honeycomb structure body 1 which satisfies the relationship of $P_{CTE}/C_{CTE} > 1.0$ provides a superior thermal shock resistance. In addition to this, it is preferable for the honeycomb structure body 1 to have the relationship of $P_{CTE}/C_{CTE}, \geq 2.5$. This structure makes it possible to further reduce the magnitude of thermal shock, and to suppress the honeycomb structure body 1 from being fractured. In order to further improve the thermal shock resistance, it is more preferable for the honeycomb structure body 1 to have the relationship of $P_{CTE}/C_{CTE} > 7.5$. Still further, it is most preferable for the honeycomb structure body 1 to have the relationship of $P_{CTE}/C_{CTE} > 13.0$.

Figure 5A:
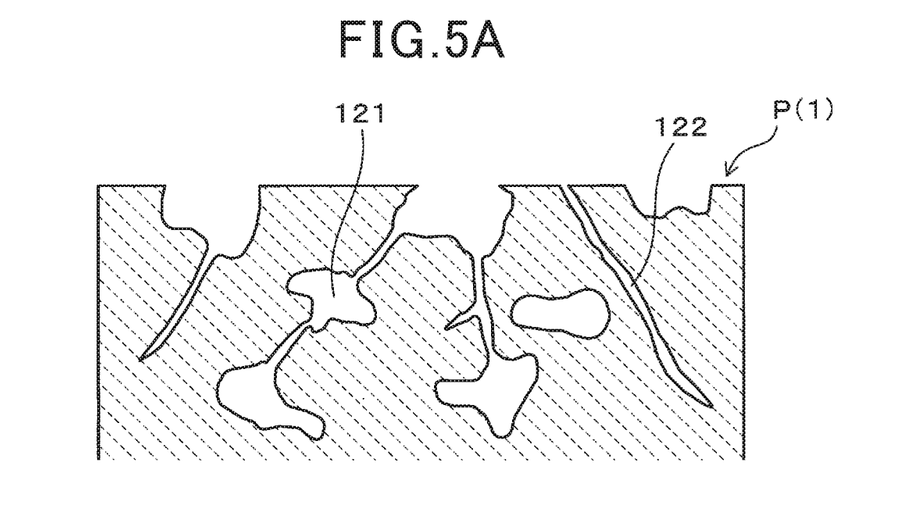
FIG. 5A is a schematic view of an enlarged partial cross section of an outer peripheral part of the honeycomb structure body before pores formed in the outer peripheral part are filled with a ceramic filler.
Figure 5B:
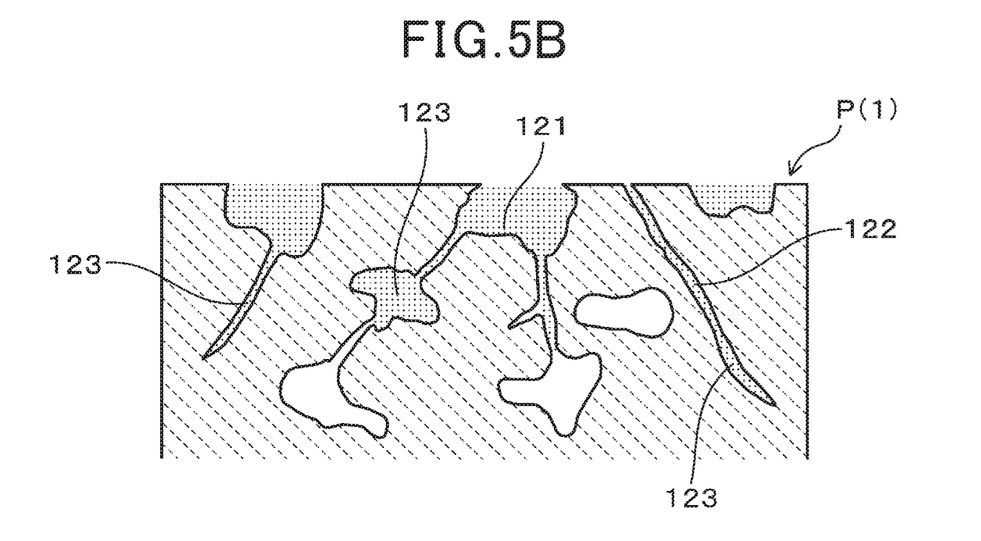
FIG. 5B is a schematic view of an enlarged partial cross section of the outer peripheral part of the honeycomb structure body after pores formed in the outer peripheral part have been filled with the ceramic filler.

FIG. 5A is a schematic view of an enlarged partial cross section of the outer peripheral part P of the honeycomb structure body 1 in which the pores formed in the outer peripheral part P are not filled with any ceramic filler, i.e. before the pores formed in the outer peripheral part P are filled with a ceramic filler. FIG. 5B is a schematic view of an enlarged partial cross section of the outer peripheral part P of the honeycomb structure body 1 after the pores formed in the outer peripheral part P have been filled with the ceramic filler 123.

As shown in FIG. 5B, it is preferable for at least one of the skin part 11 (see FIG. 4) and the outer peripheral section P (see FIG. 4) to have at least one of pores filled with the ceramic filler 123 and micro cracks 122 filled with the ceramic filler 123. Specifically, it is preferable for the honeycomb structure body 1 to have at least one of the following structures (a), (b) and (c).

(a) The pores 121 and the micro cracks 122 formed in the skin part 11 are filled with the ceramic filler 123;

(b) The pores 121 and the micro cracks 122 formed in the partition walls 12 of the outer peripheral part P are filled with the ceramic filler 123; and (c) The micro cracks 122 and the micro cracks 122 formed in both the skin part 11 and the partition walls 12 of the outer peripheral part P are filled with the ceramic filler 123.

At least one of the structures (a), (b) and (c) makes it possible to increase the thermal expansion coefficient $P_{CTE}$ of the outer peripheral section P more than the thermal expansion coefficient $C_{CTE}$ of the central section C.

A description will now be given of the reason why the above phenomenon occurs is explained as follows.

The areas designated by dashed lines shown in FIG. 5A and FIG. 5B correspond to the partition walls 12 in the outer peripheral section P and the skin part 11 made of ceramic.

As shown in FIG. 5A, pores 121 and the micro cracks 122 are formed in each of the skin part 11 and the partition walls 12 in the outer peripheral section P. The micro cracks 122 have a width within a range of 1 to 2 μm. For example, these micro cracks 122 are formed during a firing step of firing a molded body made of ceramic so as to produce the honeycomb structure body 1.

Figure 7:
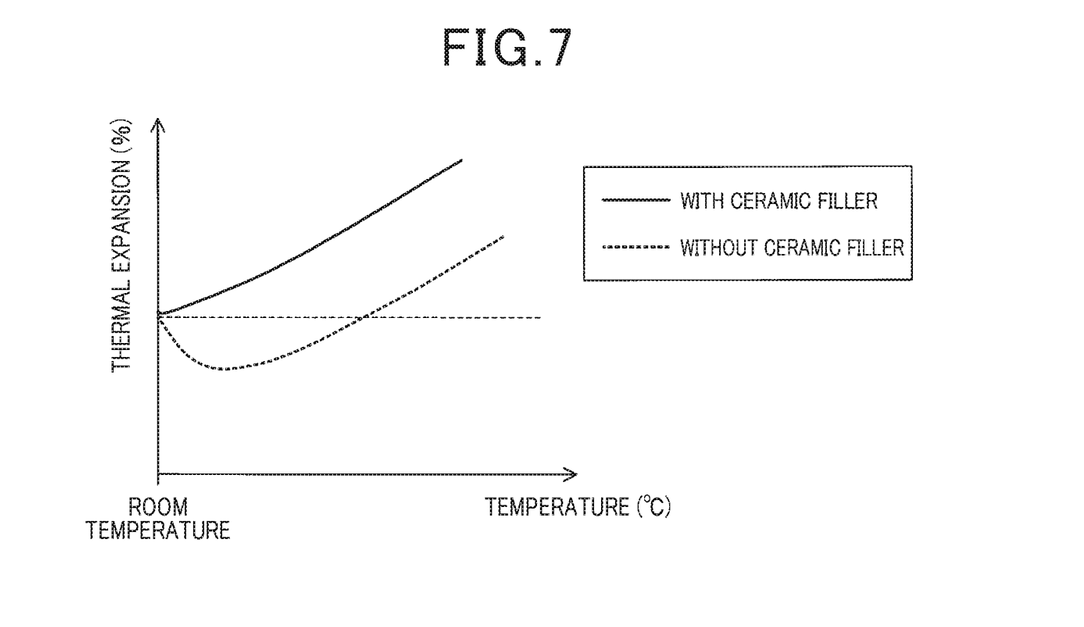
FIG. 7 is a graph showing a relationship between a temperature and a thermal expansion coefficient of a honeycomb structure body.

FIG. 7 is a graph showing a relationship between a temperature (° C.) of the honeycomb structure body and the thermal expansion coefficient (%) of the honeycomb structure body.

As designated by the curved dotted line shown in FIG. 7, the thermal expansion coefficient (%) of the honeycomb structure body 1, made of ceramic such as cordierite in which the micro cracks 122 have been formed, is gradually reduced when a temperature of the honeycomb structure body 1 increases from the room temperature, and then gradually increases. This means that the micro cracks 122 formed in the outer peripheral section P made of cordierite are closed. After the close of these micro cracks 122, the honeycomb structure body 1 is extended according to temperature increase.

The behavior of the fine pores 121 are the same as the behavior of the micro cracks 122 according to temperature increase of the honeycomb structure body 1.

On the other hand, as shown in FIG. 5B, in the structure of the honeycomb structure body 1 in which at least a part of the pores 121 and the micro cracks 122 formed in the outer peripheral section P are filled with the ceramic filler 123, it becomes difficult for the outer peripheral section P in the honeycomb structure body 1 to be extended according to increasing the temperature of the honeycomb structure body 1 because the micro cracks 122 have been filled with the ceramic filler 123 and is not deformed, and the honeycomb structure body 1 is not shrunk at the initial period of temperature rising. As designated by the solid line shown in FIG. 7, this structure makes it possible for the ceramics material such as cordierite, which forms the outer peripheral section P, to be smoothly extended according to temperature increase of the honeycomb structure body 1. In other words, this structure makes it possible to suppress the honeycomb structure body 1 from being shrunk at the initial stage of temperature rising. As a result, this structure makes it possible to increase the thermal expansion coefficient $P_{CTE}$ of the outer peripheral section P, and to satisfy the relationship of $P_{CTE} > C_{CTE}$.

In addition, it is also acceptable for a part of each of the pores 121 formed in the outer peripheral section P to be filled with the ceramic filler 123. In this structure, because the pores 121 are not completely deformed, it is possible to suppress the pores 121 from being extended, and to prevent the ceramic filler in the outer peripheral section P from being shrunk.

In order to prevent the ceramic filler 123 from being separated from the outer peripheral section P due to the repetition of thermal extension or expansion and shrinkage of the honeycomb structure body 1, it is preferable for the honeycomb structure body 1 to satisfy the relationship of $P_{CTE}/C_{CTE} \leq 36$, more preferable to satisfy the relationship of $P_{CTE}/C_{CTE} \leq 30$, and most preferable to satisfy the relationship of $P_{CTE}/C_{CTE} \leq 25$.

It is preferable to use oxide ceramic as the ceramic filler 123. Using such oxide ceramic makes it possible to prevent the honeycomb structure body 1 from being deteriorated in oxide atmosphere such as exhaust gas. This makes it possible to increase the thermal expansion coefficient of the outer peripheral section P on the basis of the thermal expansion coefficient of the ceramic filler 123.

For example, it is possible to use, as the ceramic filler 123, cordierite, silica, alumina, ceria, zirconia, ceria-zirconia solid solution, mullite, spinel, aluminum titanate, etc.

It is also acceptable for the pores 121 and the micro cracks 122 to be filled with the ceramic filler 123 and inorganic binder such as silica sol, alumina sol, ceria sol, etc.

A description will now be given of the method of producing the honeycomb structure body 1 made of cordierite as ceramics.

A clay preparation step prepares a clay containing cordierite raw material having a cordierite composition composed of talc, silica, aluminum hydroxide, etc. Further, a binder, a lubricant, and water are added into the cordierite raw material. The cordierite raw material is mixed to produce cordierite. It is acceptable to further add alumina, kaolin into the cordierite raw material as to satisfy the cordierite composition.

An extrusion mold step molds and extrudes the produced clay to produce a green body. A drying and firing step dries and fires the produced green body to produce the honeycomb structural part 10. The plug members 16 are formed in the honeycomb structural part 10 after or before the honeycomb structural part 10 and the skin part 11 have been fired. Specifically, necessary positions on the first end surface 14 and the second end surface 15 are filled with a slurry of the plug members 16. The honeycomb structural part 10 and the skin part 11 are fired so as to produce the honeycomb structure body 1 with the plug members 16.

A feeding step feeds the ceramic filler 123 into the pores 121 and the micro cracks 122 formed in the outer peripheral section P of the honeycomb structure body 1. That is, in the feeding step, the pores 121 and the micro cracks 122 formed in the outer peripheral section P are filled with the ceramic filler 123 so as to satisfy the relationship of relationship of $P_{CTE} > C_{CTE}$.

A description will now be given of the detailed explanation of obtaining the relationship of $P_{CTE} \leq C_{CTE}$.

When the ceramic filler 123 is added into a solution, the ceramic filler 123 is dispersed to produce a mixture solution. It is acceptable to mix a dispersant, and inorganic binder into the mixture solution. It is possible to use, as the solution, pure water and alcohol such as ethanol. From the viewpoint of adequately fill the ceramic filler 123 to the micro cracks 122, it is preferable for the ceramic filler 123 in the pores 121 and the micro cracks 122 to have an average particle size of less than 1 μm. It is possible to use a Laser diffraction scattering method to detect an average particle size of the ceramic filler 123. That is, the Laser diffraction scattering method provides a distribution of particle sizes (particle size distribution) of the ceramic filler 123. The particle size at a volume integrated value of 50% in the obtained particle size distribution corresponds to the average particle size of the ceramic filler 123.

The central section C in the honeycomb structure body 1 is sealed so as to prevent the mixture solution from entering into the central section C. After this sealing step, an impregnation step is performed so that the outer peripheral section P is impregnated with the mixture solution. That is, the experiment performed a coating process using the mixture solution containing the ceramic filler 123 so that the central section C was coated with the mixtures solution as a sealing wax so as to plug the pores 121 and the micro cracks 122 formed in the central section C. In an immersing step, the honeycomb structure body 1 is immersed into the mixture solution. The mixture solution is fed into the pores 121 and the micro cracks 122 formed in the outer peripheral section P. The mixture solution enters into the pores 121 and the micro cracks 122 formed in the outer peripheral section P.

It is also acceptable to feed the mixture solution into the skin part 11, where the fed amount of the mixture solution is adjusted to prevent it from entering the central section C. This adjustment makes it possible to feed the mixture solution into the pores 121 and the micro cracks 122 formed in the outer peripheral section P only, and to feed particles of the ceramic filler 123 into the inside of the pores 121 and the micro cracks 122. After this adjustment step, the honeycomb structure body 1 is dried so as to eliminate a solution component from the mixture solution in the pores 121 and the micro cracks 122.

For example, it is possible to adjust a total amount of the ceramic filler 123 present in the pores 121 and the micro cracks 122 in the outer peripheral section P by adjusting a concentration of the ceramic filler 123 in the mixture solution or by adjusting a repetition of the impregnation step and the drying step.

Next, a baking step bakes the ceramic filler 123 embedded in the pores 121 and the micro cracks 122 in the outer peripheral section P so as to produce the honeycomb structure body 1 satisfying the relationship of $P_{CTE} > C_{CTE}$ in which the pores 121 and the micro cracks 122 formed in the outer peripheral section P are filled with the baked ceramic filler 123. During the baking step, the sealing was is evaporated.

As previously described, the honeycomb structure body 1 according to the first exemplary embodiment has the plug members 16. However, the concept of the present disclosure is not limited by this. It is acceptable for the honeycomb structure body 1 to have no plug member, in which the overall cells are completely open on the first end surface 14 and the second end surface 15 which are perpendicular to the axial direction Y of the honeycomb structure body 1. It is possible to apply the honeycomb structure body 1 without the plug members 16 to a base member to support three way catalyst. That is, it is possible for the honeycomb structure body, having the structure in which the cells are open on both the first end surface and the second end surface, to have a superior thermal shock resistance so long as it satisfies the relationship of $P_{CTE} > C_{CTE}$.

Second Exemplary Embodiment

A description will be given of the honeycomb structure body according to a second exemplary embodiment with reference to FIG. 8, FIG. 9, FIG. 10A and FIG. 10B.

Figure 8:
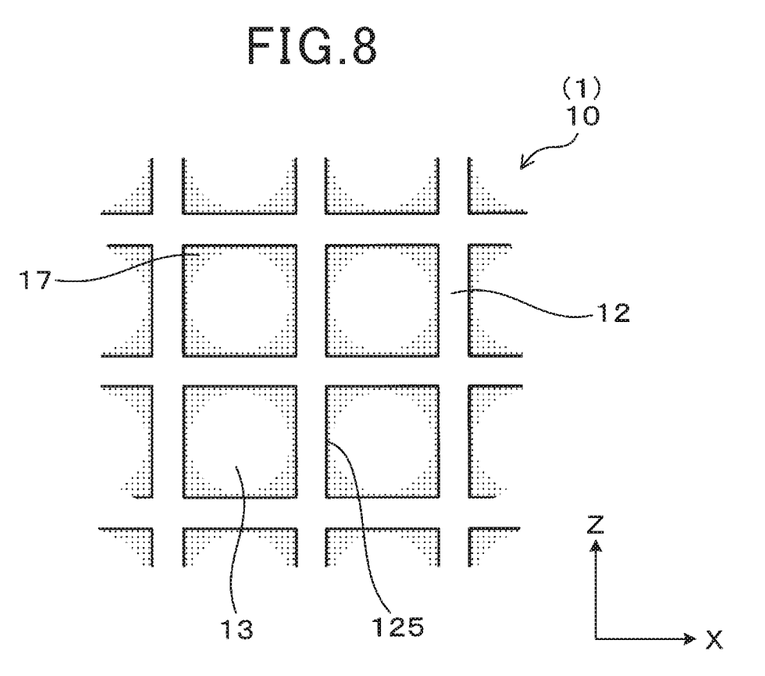
FIG. 8 is a view showing an enlarged partial cross section of the honeycomb structure body according to a second exemplary embodiment of the present disclosure, in a direction which is orthogonal to the axial direction of the honeycomb structure body.

FIG. 8 is a view showing an enlarged partial cross section of the honeycomb structure body 1 according to the second exemplary embodiment, in a direction which is orthogonal to the axial direction Y of the honeycomb structure body 1.

The same components between the first exemplary embodiment and the second exemplary embodiment will be referred to with the same reference numbers and characters, and the explanation of the same components is omitted for brevity.

As shown in FIG. 8, a catalyst layer 17 is formed on the partition walls 12 in the honeycomb structure body 1 according to the second exemplary embodiment. The catalyst layer 17 contains three way catalyst composed of noble metals such as platinum (Pt), rhodium (Rh) and palladium (Pd). It is acceptable for the catalyst layer 17 to further contain alumina and a promoter. It is possible to use, as the promoter, ceria, zirconia, ceria-zirconia solid solution, etc. Alumina is used as a binder and an aggregate. The catalyst layer 17 is formed on porous walls 124 of the pores 121 formed in the partition walls 12 and cell walls 125 of the cells 13. In other words, as shown in FIG. 2, the cell walls 125 are the surfaces of the partition walls 12 because each cell 13 is surrounded by the partition walls 12. The porous walls 124 form the pores 121. Each cell 13 is surrounded by the cell walls 125.

The catalyst layer 17 is formed in the honeycomb structure body 1 before or after the plug members 16 are formed in the honeycomb structure body 1. The partition walls 12 are coated with a catalyst slurry composed of a noble metal, alumina, a promoter, etc. The partition walls 12 having the catalyst layer 17 are heated so as to support catalyst such as a three-way catalyst in the honeycomb structure body 1. It is possible to perform a suction step of sucking the catalyst slurry so as to feed the catalyst slurry onto the surfaces of the cell walls 125 and the surfaces of the porous walls 124. The suction step makes it possible to easily form the catalyst layer 17 on the surfaces of the cell walls 125 and the surfaces of the porous walls 124.

Figure 9:
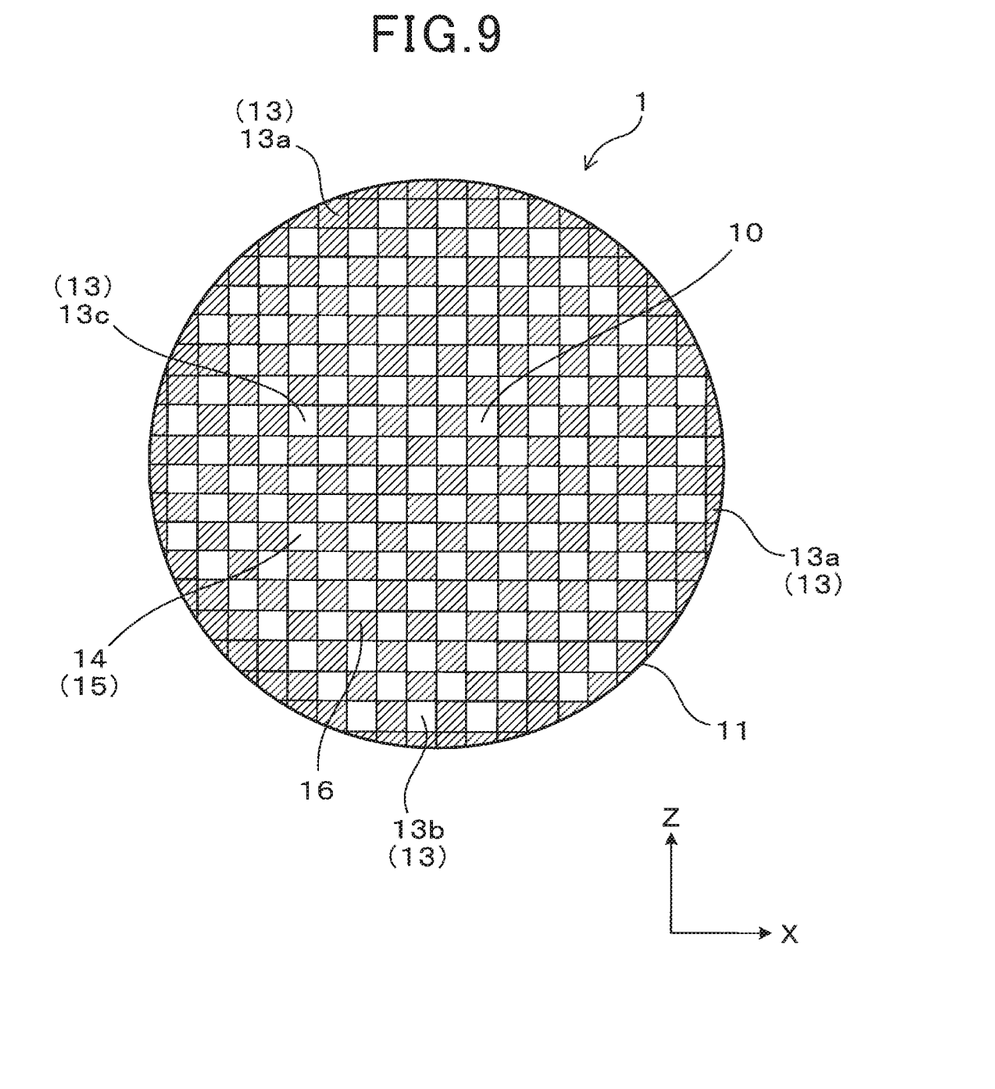
FIG. 9 is a view showing an end surface of the honeycomb structure body shown in FIG. 8, in a direction which is orthogonal to the axial direction of the honeycomb structure body.

FIG. 9 is a view showing the end surface of the honeycomb structure body 1 shown in FIG. 8, in a direction which is orthogonal to the axial direction Y of the honeycomb structure body 1. As shown in FIG. 9, in the structure of the honeycomb structure body 1 according to the second exemplary embodiment, it is preferable for the first cells 13a arranged adjacent to the skin part 11 to be plugged by the plug members 16. That is, it is preferable for the honeycomb structure body 1 to have the structure in which the first cells 13a, at both the first end surface 14 side and the second end surface 15 side, are plugged by the plug members 16. This structure makes it possible to prevent the first cells 13a from being completely sealed by the catalyst layer 17. The first cells 13a are easily sealed by the catalyst slurry during the catalyst layer formation step previously described because each of the first cells 13a has a cross sectional area which is smaller than that of the other cells 13 such as the second cells 13b and the third cells 13c in the direction which is perpendicular to the axial direction Y of the honeycomb structure body 1. The first cells 13a sealed or closed by the catalyst slurry do not purify exhaust gas G. The formation of the first cells 13a sealed with the catalyst slurry increases the production cost of the honeycomb structure body 1 because the first cells 13a consume an excess amount or unnecessary amount of the catalyst slurry, and the catalyst slurry contains expensive noble metal. As previously described, the plug members 16 are formed at the first end surface 14 side and the second end surface 15 side in each of the first cells 13a. Because both the ends (at the first end surface 14 side and the second end surface 15 side) of each of the first cells 13a are plugged before the formation of the catalyst layer 17, it is possible to prevent the catalyst layer 17 from being formed in each of the first cells 13a, and to prevent each of the first cells 13a from being clogged by the catalyst layer 17. This makes it possible to suppress the production cost of the honeycomb structure body 1 from increasing while maintaining the exhaust gas purification capability.

<Experimental Results>

A description will be given of evaluation and experimental results of the thermal shock resistance of first to seventh test samples TS1 to TS7 as honeycomb structure bodies having a different relationship of $P_{CTE}/C_{CTE}$.

Similar to the clay preparation step in the first exemplary embodiment previously described, the clay was prepared having a cordierite composition, for example, which was composed of talc, silica, aluminum hydroxide, etc. Further, a binder, a lubricant, and water were added into the cordierite raw material. The extrusion mold step molded and extruded the produced clay to produce a plurality of green bodies. The drying and firing step dried and fired the produced green bodies to produce the test samples as the honeycomb structural part. After this, the plug members were added into each of the first to seventh test samples TS1 to TS7, each having the skin part 11, the honeycomb structural part 10 and the plug members 16. Similar to the first exemplary embodiment, the ceramic filler 123 was formed in the outer peripheral part P of each of the test samples. Table 1 shows the structure of each of the first to seventh test samples TS1 to TS7 as the honeycomb structure bodies. The experiment further produced a comparative sample CS1 without using a ceramic filler.

The experiment used the ceramic filler 123 composed of silica, cordierite, alumina, and zirconia or forsterite. The ceramic filler 123 dispersed in the mixture solution had a particle size of less than 1 μm. The solvent of the mixture solution was pure water.

The ceramic filler 123 dissolved in the mixture solution was 10 g/Litter, which will also be referred to as the basic concentration. The first test sample TS1 used a concentration which is a half of the basic concentration. The third test sample TS3 was produced by performing three times the repetition of the immersing step and the drying step. As previously described, in the immersing step, the outer peripheral part P of the third test sample 3 is immersed into the mixture solution.

The fourth test sample TS4 to the seventh test sample TS7 were produced by using the mixture solution containing silica sol as an inorganic binder having a concentration of 1.0 g/L in the mixture solution. The fourth test sample TS4 to the seventh test sample TS7 were fired at a temperature of 1000° C. for 30 minutes.

(Extraction of Measurement Samples from Each of the First to Seventh Test Samples TS1 to TS7 and the Comparative Sample CS1)

The experiment prepared a plurality of measurement samples by extracting them from each of the first to seventh test samples TS1 to TS7 and the comparative sample CS1 as the honeycomb structure bodies. The experiment detected a thermal expansion coefficient of each of the measurement samples.

Figure 10A:
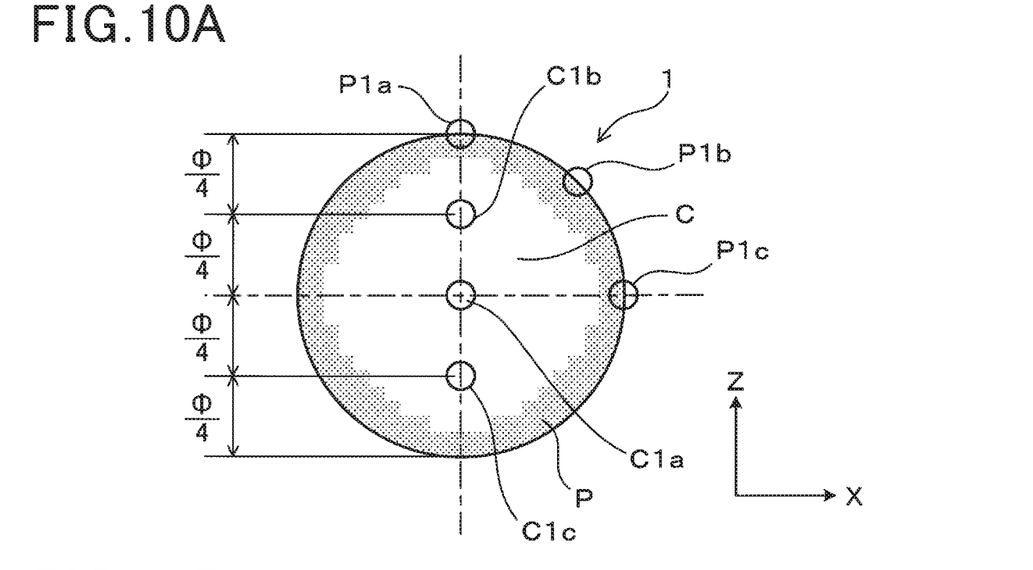
FIG. 10A is a view showing sampling positions of the measurement samples along the radial direction of each of the test samples and the comparative sample.
Figure 10B:
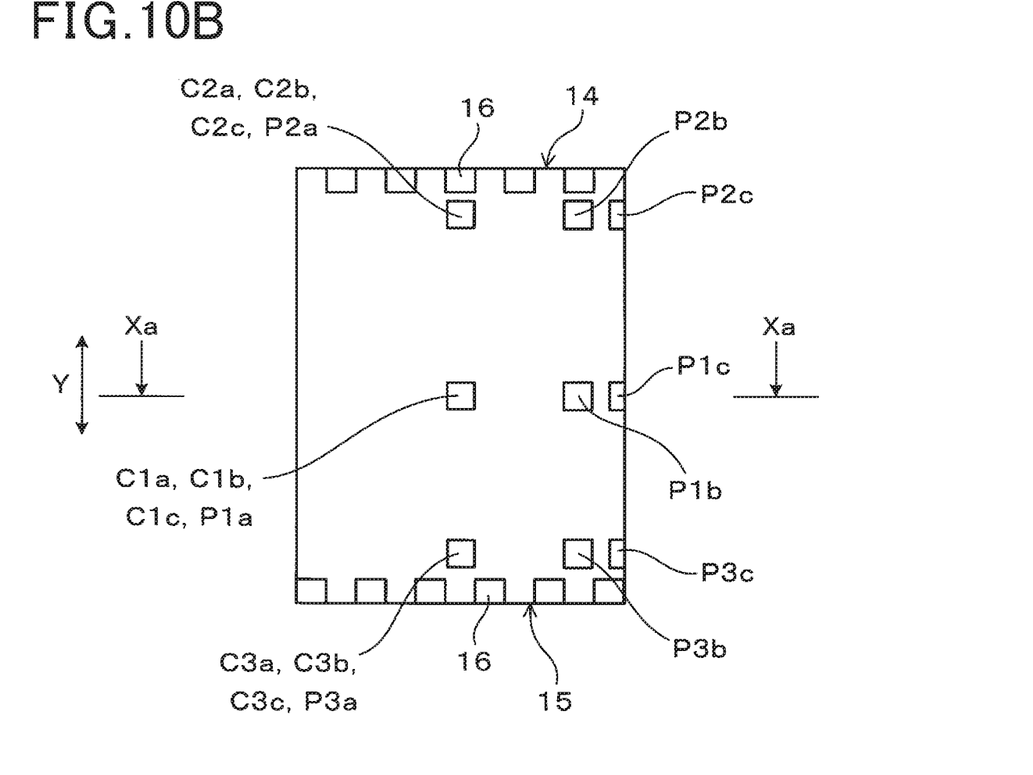
FIG. 10B is a view showing the sampling positions of the measurement samples along the axial direction of each of the test samples and the comparative sample.

FIG. 10A is a view showing sampling positions of the measurement samples extracted along the radial direction of each of the test samples TS1 to TS7 and the comparative sample CS1. FIG. 10B is a view showing the sampling positions of the measurement samples along the axial direction Y of each of the first to seventh test samples TS1 to TS7 and the comparative sample CS1.

As shown in FIG. 10A and FIG. 10B, the experiments extracted the measurement samples from nine position C1*a*, C1*b*, C1*c*, C2*a*, C2*b*, C2*c*, C3*a*, C3*b* and C3*c* in the central section C, and further extracted the measurement samples from nine position P1*a*, P1*b*, P1*c*, P2*a*, P2*b*, P1*c*, P3*a*, P3*b* and P3*c* in the outer peripheral section P of each of the first to seventh test samples TS1 to TS7 and the comparative sample CS1.

FIG. 10A is a schematic view showing a cross section including the central section C and the outer peripheral section P along the line Xa-Xa shown in FIG. 10B.

Specifically, as shown in FIG. 10A, on a cross section in the axial direction Y at a middle position of each of the first to seventh test samples TS1 to TS7 and the comparative sample CS1, the measurement samples were extracted from three positions, i.e. at the central position C1*a*, and the first position C1*b* and the second position C1*c*. As shown in FIG. 10A, the first position C1*b* and the second position C1*c* are radially separated along the vertical direction Z from the central position C1*a* by ±Φ/4.

As shown in FIG. 10A and FIG. 10B, the experiment further extracted other measurement samples from the positions C2*a*, C2*b* and C2*c* inside the plug members 16 formed on the first end surface 14 in the axial direction Y, which corresponded in location to the central position C1*a* and the first and second positions C1*b* and C1*c*. As previously described, the central position C1*a* and the first and second positions C1*b* and C1*c* were located on the cross section at the middle of each test sample and comparative sample CS1.

The experiment further extracted other measurement samples from the positions C3*a*, C3*b* and C3*c* inside the plug members 16 formed on the second end surface 15 in the axial direction Y, which corresponded in location to the central position C1*a* and the first and second positions C1*b* and C1*c*.

As previously described, the experiment extracted the nine measurement samples from the positions C1*a*, C1*b*, C1*c*, C2*a*, C2*b*, C2*c*, C3*a*, C3*b* and C3*c* in the central section C in each of the first to seventh test samples TS1 to TS7 and the comparative sample CS1. Hereinafter, the measurement samples extracted from the positions C1*a*, C1*b*, C1*c*, C2*a*, C2*b*, C2*c*, C3*a*, C3*b* and C3*c* will be referred to as the measurement samples C1*a*, C1*b*, C1*c*, C2*a*, C2*b*, C2*c*, C3*a*, C3*b* and C3*c*.

As shown in FIG. 10A, on a cross section in the axial direction Y of each of the first to seventh test samples TS1 to TS7 and the comparative sample CS1, the experiment extracted measurement samples from three positions P1*a*, P1*b* and P1*c* in the skin part 11 separated in position from the central position C1*a* by Φ/2, 45° and 90°. Hereinafter, the measurement samples extracted from the three positions P1*a*, P1*b* and P1*c* will be referred to as the measurement samples P1*a*, P1*b* and P1*c*.

As shown in FIG. 10A and FIG. 10B, the experiment further extracted from three positions P2*a*, P2*b* and P2*c* inside the plug members 16 formed on the first end surface 14 in the axial direction Y of each of the first to seventh test samples TS1 to TS7 and the comparative sample CS1. The three positions P2*a*, P2*b* and P2*c* correspond to the three positions P1*a*, P1*b* and P1*c*. Hereinafter, the measurement samples extracted from the three positions P2*a*, P2*b* and P2*c* will be referred to as the measurement samples P2*a*, P2*b* and P2*c*.

Furthermore, as shown in FIG. 10A and FIG. 10B, the experiment further extracted from three positions P3*a*, P3*b* and P3*c* inside the plug members 16 formed on the second end surface 15 in the axial direction Y of each of the first to seventh test samples TS1 to TS7 and the comparative sample CS1. The three positions P3*a*, P3*b* and P3*c* correspond to the three positions P1*a*, P1*b* and P1*c*. Hereinafter, the measurement samples extracted from the three positions P3a, P3b and P3c will be referred to as the measurement samples P3a, P3b and P3c.

As previously described, the experiment extracted the nine measurement samples C1a, C1b, C1c, C2a, C2b, C2c, C3a, C3b and C3c from the central section C, and further extracted the nine measurement samples P1a, P1b, P1c, P2a, P2b, P2c, P3a, P3b and P3c from the outer peripheral section P of each of the first to seventh test samples TS1 to TS7 and the comparative sample CS1.

The experiment used a core drill to extract each of the measurement samples having 5 mm diameter and 20 mm length in the longitudinal direction of each measurement sample. That is, the longitudinal direction of each measurement sample corresponds to the extension direction of the core drill and the axial direction Y of the honeycomb structure body 1 as each test sample.

Each of the measurement samples C1a, C1b, C1c, C2a, C2b, C2c, C3a, C3b and C3c extracted from the central section C had a cylindrical shape. On the other hand, although each of the measurement samples P1a, P1b, P1c, P2a, P2b, P2c, P3a, P3b and P3c extracted from the outer peripheral section P had a shape different from the cylindrical shape, this structure has no problem in correctly measuring a thermal expansion coefficient of each of the measurement samples P1a, P1b, P1c, P2a, P2b, P2c, P3a, P3b and P3c extracted from the outer peripheral section P.

As previously described, the experiment extracted the measurement samples from at the position in the outer peripheral section P which were separated from the central section by Φ/2. It is acceptable to extract a measurement sample from any position inside the position in the outer peripheral section P separated from the central section by Φ/2 so long as the extracted measurement sample substantially has a cylindrical shape.

In a case of a honeycomb structure body without any plug member 16, it is acceptable to extract a measurement sample from a position inside the first end surface 14 or the second end surface 15 in the axial direction Y of the honeycomb structure body (Measurement of Thermal Expansion Coefficient)

The experiment detected a behavior in thermal expansion coefficient of each of the measurement samples within a temperature range from 25° C. (as the room temperature) to 800° C.

The experiment used a thermochemical analyzer (TMA) so as to measure the behavior in thermal expansion coefficient of each of the measurement samples. The experiment used, as the TMA, TMA-60 manufactured by the Shimadzu Corporation. The experiment used a quartz as a standard sample.

The experiment detected a thermal expansion coefficient of each measurement sample within the temperature range of 25° C. to 800° C. For example, the experiment measured an extension in the length in the axial direction Y of each of the nine measurement samples C1a, C1b, C1c, C2a, C2b, C2c, C3a, C3b and C3c extracted from the central section C, and each of the nine measurement samples P1a, P1b, P1c, P2a, P2b, P2c, P3a, P3b and P3c extracted from the outer peripheral section P.

In each of the first to seventh test samples TS1 to TS7 and the comparative sample CS1, the thermal expansion coefficient $C_{CTE}$ of the central section C of each measurement sample indicates an average value of the thermal expansion coefficients of the nine measurement samples C1a, C1b, C1c, C2a, C2b, C2c, C3a, C3b and C3c. The thermal expansion coefficient $P_{CTE}$ of the outer peripheral section P of each measurement sample indicates an average value of the thermal expansion coefficients of the nine measurement samples P1a, P1b, P1c, P2a, P2b, P2c, P3a, P3b and P3c.

Table 1 shows experimental results of the thermal expansion coefficient of each of the first to seventh test samples TS1 to TS7 and the comparative sample CS1.

(Evaluation of Thermal Shock Resistance)

The experiment evaluated the thermal shock resistance of each of the first to seventh test samples TS1 to TS7 and the comparative sample CS1. The experiment supplied exhaust gas G emitted from an internal combustion engine (not shown) to each of the first to seventh test samples TS1 to TS7 and the comparative sample CS1 which were arranged in the exhaust gas pipe 3 (see FIG. 6).

The experiment changed a temperature of the exhaust gas G within a range of from less than 100° C. to 1000° C. for two minutes at an upstream-side location separated by 10 mm from the first end surface 14 of each of the first to seventh test samples TS1 to TS7 and the comparative sample CS1. Next, the experiment rapidly changed the temperature of the exhaust gas G to a low temperature of less than 100° C. for two minutes. The experiment repeated this cycle of temperature rising and cooling five times. After this, visual inspection was performed so as to detect the presence of cracks in each of the first to seventh test samples TS1 to TS7 and the comparative sample CS1.

The experiment cut each of the first to seventh test samples TS1 to TS7 and the comparative sample CS1 into several pieces every 20 mm interval along the axial direction Y measured from the first end surface 14 or the second end surface 15. In the experiment visual inspection was performed for each of the cut pieces to detect the presence of cracks inside and outside each cut piece. If no cracks were generated therein, the evaluation result indicates PERFECT. On the other hand, if one or more cracks occurred at least one of inside and outside thereof, the evaluation result indicates DEFECTIVE. Table 1 shows the experimental results.

TABLE 1

| Sample No. | Thermal expansion Coefficient (×10$^{-6}$/° C.) | | | Ceramic Material | Evaluation Results | Remarks |
| | $C_{CTE}$ | $P_{CTE}$ | $P_{CTE}/C_{CTE}$ | | | |
|---|---|---|---|---|---|---|
| CS1 | 0.2 | 0.2 | 1.0 | none | DEFECTIVE | — |
| TS1 | 0.2 | 0.3 | 1.5 | Silica | PERFECT | One coating step using half concentration mixture solution containing ceramic filler |
| TS2 | 0.2 | 0.5 | 2.5 | Silica | PERFECT | One coating step using mixture solution containing ceramic filler |
| TS3 | 0.2 | 1.5 | 7.5 | Silica | PERFECT | Three coating steps using mixture solution containing ceramic filler |
| TS4 | 0.2 | 2.6 | 13.0 | Cordierite | PERFECT | One coating step using mixture solution |

TABLE 1-continued

| Sample No. | Thermal expansion Coefficient ($\times 10^{-6}$/° C.) | | | Ceramic Material | Evaluation Results | Remarks |
|---|---|---|---|---|---|---|
| | $C_{CTE}$ | $P_{CTE}$ | $P_{CTE}/C_{CTE}$ | | | |
| TS5 | 0.2 | 4.9 | 24.5 | Alumina | PERFECT | containing ceramic filler and inorganic binder One coating step using mixture solution containing ceramic filler and inorganic binder |
| TS6 | 0.2 | 7.2 | 36.0 | Zircinia | PERFECT | One coating step using mixture solution containing ceramic filler and inorganic binder |
| TS7 | 0.2 | 7.7 | 38.5 | Forsterite | PERFECT | One coating step using mixture solution containing ceramic filler and inorganic binder |

CS1: Comparative sample CS1,
TSn: Test Sample n (n = TS1 to TS7),
$C_{CTE}$: Thermal expansion coefficient $C_{CTE}$ in the central section C, and
$P_{CTE}$: Thermal expansion coefficient $P_{CTE}$ in the outer peripheral section P.

As can be understood from the experimental results shown in Table 1, the first to seventh test samples TS1 to TS7 (as the honeycomb structure bodies) have a superior thermal shock resistance when compared with that of the comparative sample CS1 because the thermal shock resistance $P_{CTE}$ of the outer peripheral section P is greater than the thermal shock resistance $C_{CTE}$ of the central section C in the first to seventh test samples TS1 to TS7. For example, the first to seventh test samples TS1 to TS7 have the ratio $P_{CTE}/C_{CTE}$ within a range of 1.5 to 38.5, and the evaluation result thereof indicates PERFECT.

On the other hand, the comparative sample CS1 has the ratio $P_{CTE}/C_{CTE}$ of 1.0. The thermal shock resistance $P_{CTE}$ of the outer peripheral section P is substantially equal to the thermal shock resistance $C_{CTE}$ of the central section C in the comparative example CS1. The evaluation result of the comparative example CS1 is judged as DEFECTIVE.

In general, there is a trend in which the central section C and the outer peripheral section P substantially have the same thermal expansion coefficient or the thermal expansion coefficient of the central section C is greater than the thermal expansion coefficient of the outer peripheral section P in a honeycomb structure body in which the skin part 11 and honeycomb structural part 10 have been formed and fired together as a monolithic body. This means that a ceramic filler is more crystallized in the outer peripheral section P than in the central section C because thermal energy is conducted from the outer skin part 11 to the inside of the honeycomb structural part 10 during the firing step. Accordingly, a ceramic honeycomb structure body made of ceramic, in which the skin part 11 and the honeycomb structural part 10 are formed together in a monolithic body, has a specific structure in which the skin part 11 has the thermal expansion coefficient which is substantially equal to or smaller than the thermal expansion coefficient of the central section C.

As can be understood from the experimental results shown in Table 1, when each test sample has been produced by immersing the outer peripheral section P into the mixture solution containing a ceramic filler, each of the first to seventh test samples TS1 to TS7 has the relationship of $P_{CTE}>C_{CTE}$ and the thermal shock resistance of each test sample is improved. That is, this makes it possible for each test sample to have a superior thermal shock resistance.

After the evaluation step of the thermal shock resistance previously described, the experiment detected the thermal expansion coefficient of the outer peripheral section P in each of the first to seventh test samples TS1 to TS7 and the comparative sample CS1. As a result, the outer peripheral section P in each of the first to sixth test samples TS1 to TS6 has the thermal expansion coefficient which is equal to the thermal expansion coefficient $P_{CTE}$ shown in Table 1. On the other hand, the outer peripheral section P in the seventh test sample TS7 has a thermal expansion coefficient of $7.4\times10^{-6}$/° C. which is smaller than the thermal expansion coefficient $P_{CTE}$ of 7.7 shown in Table 1. This means that the ceramic filler 123 has peeled from the surface of the outer peripheral section P in the seventh test sample TS7. Specifically, as shown in Table 1, the seventh test sample TS7 has the outer peripheral section P of a large thermal expansion coefficient $P_{CTE}$, and the ratio $O_{CTE}/C_{CTE}$ which is greater than that of each of the first to sixth test samples TS1 to TS6. This increases a difference of the extension and shrinkage of the outer peripheral section P in the seventh test sample TS7 due to a temperature change of the exhaust gas G flowing in the exhaust gas pipe 3 (see FIG. 6). As a result, the ceramic filler 123 is detached from the pores 121 and the micro cracks 122 in the outer peripheral section P of the seventh test sample TS7 by a repetition of extension and shrinkage of the outer peripheral section P due to a temperature change of the exhaust gas G flowing in the exhaust gas pipe 3.

Accordingly, it is preferable for the honeycomb structure body to satisfy the ratio $P_{CTE}/C_{CTE}$ of not more than 36 ($P_{CTE}/C_{CTE} \leq 36$). The first to sixth test samples TS1 to TS6 satisfy the ratio $P_{CTE}/C_{CTE}$ of not more than 36 ($P_{CTE}/C_{CTE} \leq 36$). The structure of the first to sixth test samples TS1 to TS6 can suppress the ceramic filler 123 from being detached from the outer peripheral section P and the central section C, and provides a stable thermal shock resistance for a long period of time.

The concept of the present disclosure is not limited by the first and second exemplary embodiments previously described. It is possible for the present disclosure to have various modifications. For example, it is possible to apply the honeycomb structure body according to the present disclosure to internal combustion engines such as diesel engines, petrol engines, and to heat engines such as boilers so as to purify exhaust gas emitted from these diesel engines, petrol engines and boilers.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A honeycomb structure body comprising:
a skin part having a cylindrical shape; and
a honeycomb structural part formed with the skin part together in a monolithic body,
wherein
the skin part and the honeycomb structural part comprise partition walls having a porous structure in which pores are formed, the partition walls form cells, each of the cells being surrounded by the partition walls and extending in an axial direction of the honeycomb structure body,
the cells comprise first cells and second cells, the first cells being arranged adjacent to the skin part, and the second cells are arranged adjacent to the first cells,
wherein
the skin part, the first cells and the second cells form an outer peripheral section, and a central section is arranged inside the outer peripheral section in the honeycomb structural body, and
the honeycomb structure body satisfies a relationship in which a thermal expansion coefficient ($P_{CTE}$) of the outer peripheral section is greater than a thermal expansion coefficient ($C_{CTE}$) of the central section.

2. The honeycomb structure body according to claim 1, wherein
the partition walls of at least one of the skin part and the outer peripheral section comprise pores and micro cracks, and at least one of the pores and the micro cracks is filled with a ceramic filler.

3. The honeycomb structure body according to claim 2, wherein
the ceramic filler is composed of oxide ceramic.

4. The honeycomb structure body according to claim 3, wherein
the honeycomb structure body satisfies a relationship of $1.0 < P_{CTE}/C_{CTE} \leq 36$, where
$P_{CTE}$ is the thermal expansion coefficient of the outer peripheral section, and $C_{CTE}$ is the thermal expansion coefficient of the central section.

5. The honeycomb structure body according to claim 3, wherein
one end of each of the cells is plugged by a plug member.

6. The honeycomb structure body according to claim 2, wherein
the honeycomb structure body satisfies a relationship of $1.0 < P_{CTE}/C_{CTE} \leq 36$, where
$P_{CTE}$ is the thermal expansion coefficient of the outer peripheral section, and $C_{CTE}$ is the thermal expansion coefficient of the central section.

7. The honeycomb structure body according to claim 2, wherein
one end of each of the cells is plugged by a plug member.

8. The honeycomb structure body according to claim 1, wherein
the honeycomb structure body satisfies a relationship of $1.0 < P_{CTE}/C_{CTE} \leq 36$, where
$P_{CTE}$ is the thermal expansion coefficient of the outer peripheral section, and $C_{CTE}$ is the thermal expansion coefficient of the central section.

9. The honeycomb structure body according to claim 1, wherein
one end of each of the cells is plugged by a plug member.

* * * * *